United States Patent Office 3,449,392
Patented June 10, 1969

3,449,392
PRODUCTION OF POLYSILOXANES
Thomas Alexander Robinson, Kilwinning, Scotland, assignor to Imperial Chemical Industries Limited, London, England, a corporation of Great Britain
No Drawing. Filed July 26, 1965, Ser. No. 474,938
Claims priority, application Great Britain, Aug. 13, 1964, 33,040/64
Int. Cl. C07f 7/18; C07d 103/02
U.S. Cl. 260—448.2                18 Claims

ABSTRACT OF THE DISCLOSURE

A process for the production of 1,5-dihydroxytrisiloxanes is disclosed, wherein a cyclicorganotrisiloxane and water are reacted together in a one phase system, there also being present a neutral water miscible solvent and an acid.

---

This invention relates to a new and improved process for the production of polysiloxanes and more particularly for the production of 1,5-dihydroxyorganotrisiloxanes.

1,5-dihydroxyorganotrisiloxanes can be produced by treatment of organocyclotrisiloxanes in a variety of ways. None of the methods hitherto proposed, however, have been entirely satisfactory. Thus, for example, it is difficult to get the desired product in good yield and without undesirable further condensation taking place.

According to the present invention a new and useful process for the production of 1,5-dihydroxyorganotrisiloxanes comprises reacting together in a one-phase system an organocyclotrisiloxane and water in the presence of a water-miscible solvent and an acid having a dissociation constant of not less than $6.5 \times 10^{-2}$ at 25° C.

A variety of organocyclotrisiloxanes may be used in the process of our invention. The organo groups, which may be the same or may be different, may be, for example, methyl, ethyl, propyl, phenyl, γ-trifluoropropyl or β-cyanoethyl groups and may be present in numbers of 3 or 6. Suitable organocyclotrisiloxanes which may be used in our process include, for example, hexamethylcyclotrisiloxane, 1,3,5,triethyl - 1,3,5 - trimethylcyclotrisiloxane, cis- and trans-1,3,5,trimethyl-1,3,5-triphenylcyclotrisiloxane and hexaphenylcyclotrisiloxane.

The water may be present in widely varying proportions it being essential only that the amount should not be so excessive as to render the system no longer a one-phase one. The amount used may vary, for example, from 0.3 to 2.5 moles of water per gram atom of silicon in the organocyclotrisiloxane. It is however, normally preferred that it be not less than 1.25 mole of water per gram atom of silicon.

A wide variety of water-miscible solvents may be used. These include, for example, ethanol, acetone, tetrahydrofuran, dimethylformamide, dimethylsulphoxide, acetonitrile and formamide. Preferred solvents are those which are neutral, contain no active hydrogen and have a dielectric constant of from 2.2 to 37.6 at 20° C. and preferably of from 15 to 25.

The solvent may be used in widely varying proportions. Thus, for example, amounts of from 5 to 50 moles per mole of organocyclotrisiloxane may be used. It is in many cases convenient and in fact normally preferred to use amounts of from 8 to 30 moles per mole of organocyclotrisiloxane.

Suitable acids of dissociation constant not less than $6.5 \times 10^{-2}$ at 25° C. which may be used in our process include, for example, hydrochloric acid, hydrobromic acid, hydriodic acid, sulphuric acid, nitric acid, oxalic acid, perchloric acid, paratoluenesulphonic acid and trifluoroacetic acid. Hydrochloric acid is in many cases preferred. The acid may be present, for example, in amounts from 0.05 to 50 percent by weight of the organocyclotrisiloxane. It is in general preferred to use amounts of from 0.1 to 5 percent by weight of the organocyclotrisiloxane.

The reaction mixture is normally converted to a single phase system by agitation which is continued throughout the reaction so that a single phase system is maintained.

The reaction may be carried out over a wide range of temperature, for example, from −40 to 50° C. or higher. Reaction temperatures in the range from 15 to 30° C. are, however, generally preferred. The time required for reaction will, naturally, vary according to the materials present, their proportions and the temperature. Thus reaction times may vary up to, for example, 90 minutes in some cases while in many cases reaction will be complete in 5 to 10 minutes.

The products of our invention are capable of a wide variety of uses, for example, such as intermediates for the preparation of special types of polymer or copolymer.

Our invention is further illustrated by the following examples in which all parts and percentages are by weight.

Example 1

3.3 parts of N/20 aqueous hydrochloric acid were added to 11.1 parts of hexamethylcyclotrisiloxane dissolved in 88 parts of tetrahydrofuran. The mixture was agitated until a single phase system was obtained and maintained at 20° C. for 30 minutes. It was then poured into 500 parts of a 10 percent aqueous sodium chloride solution containing 1 part of pyridine. The organic layer was separated off and distilled in the presence of 0.05 part of magnesium. There was thus obtained 9 parts of 1,5-dihydroxyhexamethyltrisiloxane, 1.5 parts of unreacted hexamethylcyclotrisiloxane and 0.7 part of an unidentified residue.

Example 2

3.3 parts of N/2 aqueous hydrochloric acid were added to 11.1 parts of hexamethylcyclotrisiloxane dissolved in 100 parts of N,N-dimethylformamide. The mixture was formed into a single phase by agitation and maintained at 20° C. for 10 minutes. The reaction mixture was then treated in the manner described in Example 1 whereby there was obtained 1 part of 1,5-dihydroxyhexamethyltrisiloxane and 3 parts of unidentified residue.

Example 3

3.3 parts of N/2 aqueous hydrchlric acid were added to 11.1 parts of hexamethylcyclotrisiloxane dissolved in 26.2 parts of acetonitrile. The mixture was formed into a single phase by agitation and maintained at 20° C. for 1.5 minutes. The mixture was then poured into 500 parts of a 10 percent aqueous solution of sodium chloride containing 2 parts of pyridine. Further treatment in the manner described in Example 1 gave 2.2 parts of crude 1,5-dihydroxyhexamethyltrisiloxane.

Example 4

10 parts of N/2 aqueous hydrochloric acid were added to 33 parts of hexamethylcyclotrisiloxane dissolved in 238 parts of acetone. The mixture was formed into a single phase by agitation and maintained at 20° C. for 2.5 minutes. It was then poured into 1000 parts of water containing 7.5 parts of pyridine. The mass was then extracted with 100 parts of ether which was thereafter removed by evaporation. The product was then fractionally distilled whereby there was obtained 20.75 parts of 1,5-dihydroxyhexamethyltrisiloxane.

Example 5

10 parts of N/10 aqueous hydrochloric acid were added to 33.3 parts of hexamethylcyclotrisiloxane dissolved in 238 parts of acetone. The mixture was formed into a single phase by agitation and maintained at 20° C. for 30 minutes. It was then poured into 1000 parts of water containing 15 parts of pyridine and 350 parts of ether. The organic layer was separated off and dried over calcium sulphate. The ether was then removed by evaporation and the product fractionally distilled to give 14 parts of 1,5-dihydroxyhexamethyltrisiloxane.

Example 6

10 parts of $N/2$ aqueous sulphuric acid were added to 33.3 parts of hexamethylcyclotrisiloxane dissolved in 238 parts of acetone. The mixture was formed into a single phase by agitation and maintained at 20° for 60 minutes. It has then poured into 1000 parts of water and the organic layer separated, dried over anhydrous calcium chloride and added to 70 parts of ether containing 40 parts of pyridine. 33 parts of trimethylchlorosilane were added to the solution which was then filtered. The ether was evaporated from the filtrate and the residue distilled. There was thus obtained 12 parts of the bis-trimethylsilyl derivative of 1,5-dihydroxyhexamethyltrisiloxane.

Example 7

10 parts of $N/2$ aqueous nitric acid were added to 33.3 parts of hexamethylcyclotrisiloxane dissolved in 238 parts of acetone. The mixture was treated in the manner described in Example 6. There were thus obtained 9 parts of the bis-trimethylsilyl derivative of 1,5-dihydroxyhexamethyltrisiloxane.

Example 8

10 parts of $N/2$ aqueous p-toluene sulphonic acid were added to 33.3 parts of hexamethylcyclotrisiloxane dissolved in 238 parts of acetone. The mixture was treated in the manner described in Example 6. There were thus obtained 12 parts of the bis-trimethylsilyl derivative of 1,5-dihydroxyhexamethyltrisiloxane.

Example 9

5.94 parts of hexaphenylcyclotrisiloxane were mixed with 10 parts of acetone containing 0.66 part of $N/2$ aqueous hydrochloric acid. When solution was partially complete (24 hours) the solution was filtered and the filtrate evaporated to dryness. There were thus obtained 2 parts of 1,5-dihydroxyhexaphenyltrisiloxane.

What we claim is:

1. A process for the production of 1,5-dihydroxytrisiloxanes comprising reacting together at a temperature of from −40 to 50° C. and in a one phase system a cyclic hexa-organotrisiloxane selected from the group consisting of hexa-alkylcyclotrisiloxanes and hexa-arylcyclotrisiloxanes and water, the amount of water being from 0.3 to 2.5 moles per gram atom of silicon, there also being present a neutral water miscible solvent containing no active hydrogen and having a dielectric constant of from 2.2 to 37.6 at 20° C. and an acid having a dissociation constant of not less than $6.5 \times 10^{-2}$ at 25° C., the amount of acid being from 0.5 to 50 percent by weight of the cyclic organotrisiloxane.

2. A process according to claim 1 wherein the organo groups in the hexa-organocyclotrisiloxane are methyl, ethyl, propyl and phenyl.

3. A process according to claim 2 wherein the hexa-organocyclotrisiloxane is hexamethylcyclotrisiloxane, 1,3,-5-triethyl-1,3,5-triphenylcyclotrisiloxane, cis- or trans-1,3,5-trimethyl - 1,3,5 - triphenylcyclotrisiloxane or hexaphenylcyclotrisiloxane.

4. A process according to claim 1 wherein the amount of water is not less than 1.25 mole per gram atom of silicon.

5. A process according to claim 1 wherein the water-miscible solvent has a dielectric constant of from 15 to 25 at 20° C.

6. A process according to claim 1 wherein the water-miscible solvent is ethanol, acetone, tetrahydrofuran, dimethylformamide, dimethylsulphoxide, acetonitrile or formamide.

7. A process according to claim 1 wherein the water-miscible solvent is used in amount from 5 to 50 moles per mole of organocyclotrisiloxane.

8. A process according to claim 1 wherein the amount of acid is from 0.1 to 5 percent by weight of the organocyclotrisiloxane.

9. A process according to claim 1 wherein the temperature is from 15 to 30° C.

10. A process according to claim 1 wherein the acid is hydrochloric.

11. A process according to claim 1 wherein the acid is hydrobromic.

12. A process according to claim 1 wherein the acid is hydroiodic.

13. A process according to claim 1 wherein the acid is sulphuric.

14. A process according to claim 1 wherein the acid is nitric.

15. A process according to claim 1 wherein the acid is oxalic.

16. A process according to claim 1 wherein the acid is perchloric.

17. A process according to claim 1 wherein the acid is p-toluenesulphonic.

18. A process according to claim 1 wherein the acid is trifluoroacetic.

References Cited

UNITED STATES PATENTS 3,309,390  3/1967  Omietanski.

OTHER REFERENCES

Andrianov—"Polymers with Inorganic Main Chains"—U.S. Dept. of Commerce, Office of Technical Services, Joint Publications Research Service, July 22, 1963, pp. 276–277.

TOBIAS E. LEVOW, *Primary Examiner.*

P. F. SHAVER, *Assistant Examiner.*